United States Patent [19]

Seiler et al.

[11] Patent Number: 4,939,201

[45] Date of Patent: Jul. 3, 1990

[54] GLASS FIBER REINFORCED THERMOPLASTIC MOLDING COMPOSITIONS BASED ON POLYESTERS AND GRAFT POLYMERS

[75] Inventors: Erhard Seiler; Karl Ruppmich, both of Ludwigshafen; Manfred Knoll, Wachenheim; Walter Heckmann, Weinheim; Dietrich Lausberg, Ludwigshafen; Rainer Bueschl, Roedersheim-Gronau, all of Fed. Rep. of Germany

[73] Assignee: BASF Aktiengesellschaft, Ludwigshafen, Fed. Rep. of Germany

[21] Appl. No.: 255,028

[22] Filed: Oct. 7, 1988

[30] Foreign Application Priority Data

Oct. 7, 1987 [DE] Fed. Rep. of Germany ....... 3733829
Oct. 7, 1987 [DE] Fed. Rep. of Germany ....... 3733824

[51] Int. Cl.$^5$ ................................................ C08K 7/14
[52] U.S. Cl. ..................................... 524/504; 523/435; 523/436; 525/64; 525/65

[58] Field of Search ............... 523/435, 436; 524/504; 525/64, 65

[56] References Cited

U.S. PATENT DOCUMENTS

| | | | |
|---|---|---|---|
| 4,145,331 | 3/1979 | Sterzel et al. | 524/504 |
| 4,148,956 | 4/1979 | Breitenfellner et al. | |
| 4,397,986 | 8/1983 | Hornbaker | 525/64 |
| 4,404,161 | 9/1983 | Bier | 525/64 |
| 4,659,767 | 4/1987 | Dunkle et al. | 525/64 |
| 4,739,010 | 4/1988 | McKee et al. | 525/64 |

Primary Examiner—Lewis T. Jacobs
Attorney, Agent, or Firm—Oblon, Spivak, McClelland, Maier & Neustadt

[57] ABSTRACT

Thermoplastic molding compositions based on thermoplastic polyesters ($a_1$), graft polymers incorporating acrylate rubbers as grafting bases ($a_2$), copolymers of aromatic vinyl monomers and acrylonitrile or methacrylonitrile ($a_3$) which contain a polymeric component (B) having carboxyl, carboxyl derivative, hydroxyl or epoxy groups or, alternatively, where graft polymers ($a_2$) or copolymers ($a_3$) carry such groups have a balanced range of properties.

3 Claims, No Drawings

GLASS FIBER REINFORCED THERMOPLASTIC MOLDING COMPOSITIONS BASED ON POLYESTERS AND GRAFT POLYMERS

The present invention relates to thermoplastic molding compositions containing as essential components
(A) from 45 to 90% by weight of a mixture of
(a$_1$) from 50 to 80% by weight of a polyester
(a$_2$) from 10 to 25% by weight of a graft polymer built up from
(a$_{21}$) from 50 to 90% by weight of a grafting base comprising an elastomeric polymer based on
(a$_{211}$) from 95 to 99.9% by weight of a C$_2$–C$_{10}$-alkyl acrylate and
(a$_{212}$) from 0.1 to 5% by weight of a polyfunctional monomer having at least two olefinic, non-conjugated double bonds
(a$_{22}$) from 10 to 50% by weight of a graft surface comprising
(a$_{221}$) from 50 to 90% by weight of styrene or substituted styrene of the general formula I

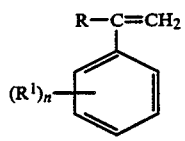

$$R-C=CH_2 \quad (I)$$
$$(R^1)_n$$

where R is alkyl of from 1 to 8 carbon atoms, hydrogen or halogen, R$^1$ is alkyl of from 1 to 8 carbon atoms or halogen, and n is 0, 1, 2 or 3, or a mixture thereof, and
(a$_{222}$) from 10 to 49% by weight of acrylonitrile or methacrylonitrile or a mixture thereof
(a$_{223}$) from 0 to 30% by weight of a polymerizable monomer having carboxyl, carboxyl derivative, hydroxyl or epoxy groups,
and
(a$_3$) from 10 to 25% by weight of a copolymer of
(a$_{31}$) from 50 to 90% by weight of styrene or substituted styrene of the general formula I or mixtures thereof and
(a$_{32}$) from 10 to 49% by weight of acrylonitrile or methacrylonitrile or a mixture thereof,
(a$_{33}$) from 0 to 30% by weight of a polymerizable monomer having carboxyl, carboxyl derivative, hydroxyl or epoxy groups,
(B) from 0 to 20% by weight of a polymeric component having carboxyl, carboxyl derivative, hydroxyl or epoxy groups and
(C) from 5 to 50% by weight of glass fibers, with the proviso that at least one of the reactive components (a$_{223}$), (a$_{33}$) or (B) is present.

The present invention also relates to the use of such molding compositions for producing moldings and to moldings obtainable from the molding compositions according to the invention as essential components.

DE-B-No. 2,758,497 (U.S. Pat. No. 4,148,956) describes thermoplastic molding compositions based on polyesters and modified styrene/acrylonitrile (SAN) copolymers using as modifying agents acrylic esters and/or α-methylstyrene. In the examples, ASA polymers are used as modified SAN polymers. If the modified SAN polymer is the main component in these compositions, films are producible therefrom with advantage. The mechanical properties, however, are still not fully satisfactory as a whole, in particular as regards the impact resistance and bending strength. Nor is the stability of the properties satisfactory following prolonged storage at elevated temperatures.

It is an object of the present invention to provide thermoplastic molding compositions based on polyesters and graft polymers free of the above-described disadvantages. More particularly, they are to have a satisfactory longterm stability in respect of the mechanical properties at elevated temperatures.

We have found that this object is achieved according to the invention by means of the thermoplastic molding compositions defined at the beginning.

As component A, the molding compositions according to the invention contain from 45 to 90, in particular from 55 to 90, and particularly preferably from 60 to 85, % by weight of a mixture of
(a$_1$) from 50 to 80% by weight of a polyester
(a$_2$) from 10 to 25% by weight of a graft polymer and
(a$_3$) from 10 to 25% by weight of a styrene/(meth)acrylonitrile copolymer.

The polyesters (a$_1$) contained in the molding compositions according to the invention are known per se. Preference is given to using polyesters which contain an aromatic ring in the main chain. The aromatic ring may also be substituted, for example by halogens, such as chlorine and bromine, and/or by C$_1$–C$_4$-alkyl groups, for example methyl, ethyl, i- or n-propyl and i-, n- or t-butyl.

The polyesters may be prepared by reacting dicarboxylic acids, esters thereof or other ester-forming derivatives thereof with dihydroxy compounds in a conventional manner.

Suitable dicarboxylic acids are for example aliphatic and aromatic dicarboxylic acids, which may also be used mixed. Examples thereof are naphthalenedicarboxylic acids, terephthalic acid, isophthalic acid, adipic acid, azelaic acid, sebacic acid, dodecanedioic acid and cyclohexanedicarboxylic acids, mixtures of these carboxylic acids and ester-forming derivatives thereof.

The dihydroxy compounds used are preferably diols of from 2 to 6 carbon atoms, particularly preferably ethylene glycol, 1,4-butanediol, 1,4-butenediol and 1,6-hexanediol; but it is also possible to use 1,4-hexanediol, 1,4-cyclohexanediol, 1,4-di(hydroxymethyl)cyclohexane, bisphenol A, neopentylglycol, mixtures of these diols and ester-forming derivatives thereof.

Polyesters of terephthalic acid and a C$_2$–C$_6$-diol component, e.g. polyethylene terephthalate or polybutylene terephthalate or mixtures thereof, are particularly preferred.

The relative viscosity $\eta_{spec}/c$ of the polyesters, measured in 0.5% strength by weight solution in aphenol-/odichlorobenzene mixture (weight ratio 3:2) at 25° C. is in general within the range from 1.2 to 1.8 dl/g.

The proportion of polyester a1) in component A is from 50 to 80, preferably from 50 to 75, in particular from 50 to 70, % by weight, based on the total weight of components (a$_1$)+(a$_2$)+(a$_3$).

The graft polymer (a$_2$), which accounts for from 10 to 25, in partic from 12 to 25, particularly preferably from 12 to 20 % by weight of component A is built up from
(a$_{21}$) from 50 to 90% by weight of a grafting base based on
(a$_{211}$) from 95 to 99.9% by weight of a C$_2$–C$_{10}$-alkyl acrylate and ($a_{212}$) from 0.1 to 5% by weight of a polyfunctional monomer having two or more olefinic, non-conjugated double bonds and ($a_{22}$) from 10 to 50% by weight of a graft surface comprising ($a_{221}$) from 50 to 90% by weight of styrene or substituted styrene of the general formula I or a mixture thereof and ($a_{222}$) from 10 to 50% by weight of acrylonitrile methacrylonitrile or a mixture thereof, ($a_{223}$) from 0 to 30% by weight of a polymerizable monomer having carboxyl, carboxyl derivative, hydroxyl or epoxy groups.

Component ($a_{21}$) is an elastomer having a glass transition temperature of below -20° C., in particular below -30° C.

To prepare the elastomer, the main monomer ($a_{211}$) comprises an ester of acrylic acid of from 2 to 10 carbon atoms, in particular of from 4 to 8 carbon atoms. Particularly preferred monomers here are tert-, iso- and n-butyl acrylate and also 2-ethylhexyl acrylate, of which the last two are particularly preferred.

These esters of acrylic acid are used together with from 0.1 to 5, in particular from 1 to 4, % by weight, based on the total weight of $a_{211}+a_{212}$, of a polyfunctional monomer having at least two olefinic, non-conjugated double bonds. Of these, difunctional compounds, i.e. those having two non-conjugated double bonds, are preferred. Examples thereof are divinylbenzene, diallyl fumarate, diallyl phthalate, triallyl cyanurate, triallyl isocyanurate, tricyclodecenyl acrylate and dihydrodicyclopentadienyl acrylate, of which the last two are particularly preferred.

Processes for preparing the grafting base ($a_{21}$) are known per se and described for example in DE-B-No. 1,260,135. Corresponding products are also commercially available.

A particularly advantageous option in some cases is the preparation by emulsion polymerization.

The exact polymerization conditions, in particular the type, the rate of metering and the amount of the emulsifier, are preferably chosen in such a way that the latex of the acrylic ester, which is at least partially crosslinked, has an average particle size (weight average $d_{50}$) within the range from about 200 to 700, in particular from 250 to 600, nm. Preferably, the latex has a narrow particle size distribution, ie. the ratio $$Q = \frac{d_{90} - d_{10}}{d_{50}}$$

is preferably less than 0.5, in particular less than 0.35.

The proportion of grafting base ($a_{21}$) in graft polymer ($a_2$) is from 50 to 90, preferably from 55 to 85, in particular from 60 to 80, % by weight, based on the total weight of ($a_2$).

The grafting base ($a_{21}$) has been grafted with a graft sheath ($a_{22}$) which is obtainable by copolymerization of ($a_{221}$) from 50 to 90, preferably from 60 to 90, in particular from 65 to 80, % by weight of styrene or substituted styrene of the general formula I

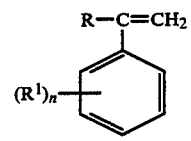

where R is alkyl of from 1 to 8 carbon atoms, hydrogen or halogen and $R^1$ is alkyl of from 1 to 8 carbon atoms or halogen, and n is 0, 1, 2 or 3, and ($a^{222}$) from 10 to 50, preferably from 10 to 40, in particular from 20 to 35, % by weight of acrylonitrile, methacrylonitrile or a mixture thereof and ($a^{223}$) from 0 to 30% by weight of a polymerizable monomer having carboxyl, carboxyl derivatives, hydroxyl or epoxy groups.

Examples of substituted styrenes are α-methylstyrene, p-methylstyrene, p-chlorostyrene and p-chloro-α-methylstyrene, of which styrene and α-methylstyrene are preferred.

The graft sheath ($a_{22}$) may be prepared in one or more, preferably two or three, steps, which have no effect on the overall composition.

If monomers ($a_{223}$) are present, their proportion of graft sheath ($a_{22}$) is from 0.1 to 30, preferably from 0.2 to 20, particularly from 0.5 to 10, % by weight based on the total weight of ($a_{22}$).

Examples of monomers ($a_{223}$) are glycidyl methacrylate, glycidyl acrylate, allyl glycidyl ether, vinyl glycidyl ether and glycidyl itaconate and also acrylic acid or methacrylic acid and their metal, in particular alkali metal, salts and ammonium salts, tert-butyl (meth)acrylate, maleic acid, maleic anhydride, metal salts of the acid monoethyl ester of maleic acid, fumaric acid, monoethyl fumarate, itaconic acid, vinyl benzoic acid, vinyl phthalic acid, salts of monoethyl fumarate, monoesters of maleic acid, fumaric acid and itaconic acid with alcohols ROH, where R has up to 29 carbon atoms, e.g. methyl, propyl, isopropyl, butyl, isobutyl, hexyl, cyclohexyl, octyl, 2-ethylhexyl, decyl, stearyl, methoxyethyl, ethoxyethyl and hydroxyethyl.

Although maleic anhydride and metal salts (in particular alkali metal and alkaline earth metal salts) of polymerizable carboxylic acids have no free carboxyl groups, they behave so similarly to the free acids that, for the purposes of the present invention, they shall be encompassed here under the generic term carboxyl-containing monomers.

A second group of suitable monomers ($a_{223}$) are monomers containing lactam groups.

These contain a lactam group of the general formula

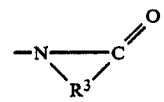

where $R_3$ is a branched or linear alkylene of from 2 to 15 carbon atoms.

Merely representative examples thereof are β-propiolactams (azetidin-2-ones) of the general formula

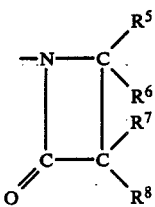

where the substituents $R^5$ to $R^8$ may each be alkyl of from 1 to 6 carbon atoms or hydrogen. They are described by R. Graf in Angew. Chem. 74 (1962), 523–530, and H. Bastian in Angew. Chem. 80 (1968), 304 | 312. Examples thereof are 3,3'-dimethyl-3-propiolactam, 2-pyrrolidones

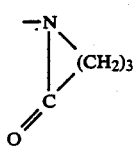

ε-caprolactam

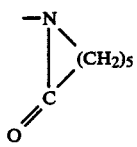

7-enantholactam, 8-capryllactam and 12-laurolactam, as also described by H. Dachs, Angew. Chemie 74 (1962), 540–45.

Of these, 2-pyrrolidones and ε-caprolactams are particularly preferred.

Preferably, the lactam groups as in

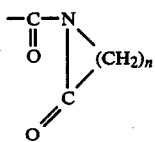

are incorporated in the corresponding monomers via a carbonyl group on the nitrogen.

A particularly preferred example thereof is N-(meth)acryloyl-ε-caprolactam

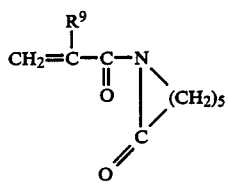

where $R^9$ is hydrogen or methyl.

Preferred monomers ($a_{223}$) are glycidyl esters of acrylic acid and methacrylic acid, maleic anhydride, tert-butyl acrylate, fumaric acid and maleic acid.

Preferably, the graft sheath is prepared in emulsion as described for example in German Pat. No. 1,260,135 and German Laid-Open Applications DOS No. 3,227,555, DOS No. 3,149,357 and DOS No. 3,414,118.

Depending on the conditions chosen, the graft copolymerization gives rise to a certain proportion of free copolymers of monomers ($a_{221}$), ($a_{222}$) and ($a_{223}$).

The graft copolymer ($a_{21}+a_{22}$) has in general an average particle size of from 100 to 1,000 nm, in particular of from 200 to 700 nm ($d_{50}$ weight average). The conditions for preparing the elastomer ($a_{21}$) and for the grafting are therefore preferably chosen so as to produce particle sizes within this range. Measures to this end are known and described for example in German Pat. No. 1,260,135, German Laid-Open Application DOS No. 2,826,925 and J. Appl. Polym. Sci. 9 (1965), 2929–38. Enlarging the particle size of the latex of the elastomer may be accomplished for example by means of agglomeration.

For the purposes of the present invention the graft polymer $a_2$ also includes the free, non-grafted homopolymers and copolymers which form in the course of the graft copolymerization for preparing component ($a_{22}$).

In what follows, some preferred graft polymers are specified:

1: 60% by weight of grafting base ($a_{21}$) from
 ($a_{211}$) 98% by weight of n-butyl acrylate and
 ($a_{212}$) 2% by weight of dihydrodicyclopentadienyl acrylate and
 40% by weight of graft sheath ($a_{22}$) from
 ($a_{221}$) 71% by weight of styrene and
 ($a_{222}$) 24% by weight of acrylonitrile
 ($a_{223}$) 5% by weight of glycidyl methacrylate
2: grafting base as in the case of 1, together with 5% by weight of a first graft sheath of styrene and 35% by weight of a second graft stage of
 ($a_{221}$) 71% by weight of styrene and
 ($a_{222}$) 24% by weight of acrylonitrile
 ($a_{223}$) 5% by weight of glycidyl methacrylate
3: grafting base as in 1, together with 13% by weight of a first graft stage of styrene and 27% by weight of a second graft stage from styrene, acrylonitrile and glycidyl methacrylate in a weight ratio of 72:24:4.
4: 60% by weight of grafting base ($a_{21}$) from
 ($a_{211}$) 98% by weight of n-butyl acrylate and
 ($a_{212}$) 2% by weight of dihydrodicyclopentadienyl acrylate and
 40% by weight of graft sheath ($a_{22}$) from
 ($a_{221}$) 71% by weight of styrene and
 ($a_{222}$) 24% by weight of acrylonitrile.
5: Grafting base as in 4 together with 5% by weight of a first graft sheath from styrene and 35% by weight of a second graft stage from
 ($a_{221}$) 71% by weight of styrene and
 ($a_{222}$) 24% by weight of acrylonitrile
6: Grafting base as in 4 together with 13% by weight of first graft stage from styrene and 27% by weight of a second graft stage from styrene and acrylonitrile in a weight ratio of 72:24:4.

Component ($a_3$) in the molding compositions according to the invention comprises from 10 to 25, preferably from 12 to 20, % by weight of a copolymer of
($a_{31}$) from 50 to 90, preferably from 55 to 90, in particular from 65 to 80% by weight of styrene and/or substituted styrene the general formula I and
($a_{32}$) from 10 to 50, preferably from 10 to 45, in particular from 20 to 35, % by weight of acrylonitrile and/or methacrylonitrile
($a_{33}$) from 0 to 30% by weight of a polymerizable monomer having carboxyl, carboxyl derivative, hydroxyl or epoxy groups, Monomers (a₃₃) are subject to the above remarks concerning (a₂₂₃) to which reference is made to avoid repetition.

Products of this type may be prepared for example by the process described in German Published Applications DAS No. 1,001,001 and DAS No. 1,003,436. Such copolymers are also commercially available. Preferably, the weight average molecular weight determined by light scattering is within the range from 50,000 to 500,000, in particular from 100,000 to 250,000.

The weight ratio of $a_2:a_3$ is within the range from 1:2.5 to 3:1, preferably from 1:2 to 2.5:1, in particular from 1:1.5 to 2:1.

Component B in the molding compositions according to the invention comprises from 0 to 20, preferably from 1 to 15, in particular from 2 to 12% by weight of a polymer component having carboxyl, carboxyl derivative, hydroxyl or epoxy groups.

In principle, it is possible to use any kind of polymer in which the carboxyl, hydroxyl or epoxy groups are essentially freely available.

In what follows, some particularly preferred examples of such functional polymers are described in more detail.

The first group to be mentioned here comprises elastomeric polymers having epoxy and/or carboxyl groups at the surface.

It is essential for this aspect of the invention that the adhesion-promoting epoxy and/or carboxyl groups are present at the surface and that the gel content is not less than 50%.

Preference is given to using emulsion-polymerized graft polymers having glass transition temperatures below 0° C. and gel contents of more than 50%.

The high gel content of the elastomeric polymer brings about an improvement in the mechanical properties and in the surface quality of the molding compositions. The high gel content also brings about that the fluency of polymers (B) is only very low, so that frequently no melt flow index is determinable under standard conditions. On the contrary, the polymers show elastic properties, reacting to the action of a deforming force with an elastic restoring force (cf. B. Vollmert, Grundriss der makromolekularen Chemie, vol. IV, p. 85 ff, E. Vollmert, Verlag Karlsruhe 1979).

Owing to their preparation in emulsion, the particles of component (B) are present in the form of crosslinked dispersion particles.

The elastomeric graft polymers which have been built up from a rubber prepared in emulsion and having a glass transition temperature of below 0° C. and which have epoxy or carboxyl groups at the surface may be prepared by emulsion polymerization in a conventional manner as described for example in Houben-Weyl, Methoden der organischen Chemie, volume XII.I (1961). The usable emulsifers and catalysts are known per se.

Merely representative examples of monomers for preparing the rubber are acrylates such as n-butyl acrylate and 2-ethylhexyl acrylate, methacrylates, and also butadiene and isoprene These monomers may also be copolymerized with other monomers, e.g. styrene, acrylonitrile and vinyl ethers.

Monomers which are capable of bringing about a coupling to component (A) are those which contain epoxy and/or carboxyl groups Examples of such monomers are glycidyl methacrylate, glycidyl acrylate, allyl glycidyl ether, vinyl glycidyl ether and glycidyl itaconate, and also acrylic acid, methacrylic acid and their metal, in particular alkali metal, salts and ammonium salts, maleic acid, maleic anhydride, metal salts of the acid monoethyl ester of maleic acid, fumaric acid, monoethyl fumarate, itaconic acid, vinylbenzoic acid, vinylphthalic acid, salts of monoethyl fumarate, monoesters of maleic acid, fumaric acid and itaconic acid with alcohols ROH where R has up to 29 carbon atoms, eg. methyl, propyl, isopropyl, butyl, isobutyl, hexyl, cyclohexyl, octyl, 2-ethylhexyl, decyl, stearyl, methoxyethyl, ethoxyethyl and hydroxyethyl.

Although maleic anhydride and metal salts (in particular alkali metal and alkaline earth metal salts) of polymerizable carboxylic acids have no free carboxyl groups, they behave so similarly to the free acids that, for the purposes of the present invention, they shall be encompassed here under the generic term carboxyl-containing monomers.

The emulsion-polymerized graft (or dispersion) polymers can be of the multi-shell type, the core and the outer shell being identical, for example, except that the outer shell contains additional groups which make possible an adhesion to component (A). Examples thereof are an inner core of n-butyl acrylate and an outer shell of n-butyl acrylate and glycidyl methacrylate, or an inner core of butadiene and an outer shell of butadiene and glycidyl methacrylate. However, the core and the shell may also have different structures, comprising for example an inner core of butadiene and an outer shell of n-butyl acrylate and glycidyl methacrylate.

Of course, the rubber can also have a homogeneous structure, for example of the single-shell type comprising a copolymer of n-butyl acrylate and glycidyl methacrylate or butadiene and glycidyl methacrylate.

The rubber particles may also be crosslinked. Suitable crosslinking monomers are for example butadiene, divinylbenzene, diallyl phthalate and dihydrodicyclopentadienyl acrylate. The proportion of these crosslinkers in component (B) is preferably below 5% by weight, based on (B).

Further examples of component (B) are copolymers built up from styrene and/or substituted styrenes of the general formula I and monomers containing epoxy or lactam groups.

The proportion of styrene and/or substituted styrene in component B is generally within the range from 50 to 99.9% by weight, preferably from 70 to 95% by weight.

It is of course also possible to use mixtures of different substituted styrenes or mixtures of styrene and substituted styrenes, and this may frequently even be advantageous.

By using monomers containing epoxy or lactam groups in the polymerization of styrene and/or substituted styrene it is possible to prepare the components B according to the invention which are derived from styrene polymers.

Of monomers which contain epoxy groups

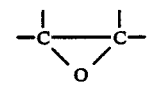

those containing a plurality of epoxy groups are preferred. In principle, any epoxy-containing monomer is suitable, as long as it is certain that after the reaction the epoxy group is present in the free form.

It is to be noted that the introduction of free epoxy groups into polymer B is also possible by epoxidating polymers from the monomers using epoxidants.

The proportion of epoxy-containing monomer is from 0.1 to 30% by weight, preferably from 0.5 to 20% by weight, particularly preferably from 1 to 10% by weight, based on component B.

Merely representative examples of epoxy-containing monomers are glycidyl-containing monomers, e.g. vinyl glycidyl ether, allyl glycidyl ether and (meth)acrylates containing glycidyl groups, in particular glycidyl acrylate and glycidyl methacrylate.

Preferred components B derived from styrene polymers having epoxy groups are for example copolymers of
($B_1$) from 90 to 99% by weight of styrene, α-methylstyrene and/or p-methylstyrene
($B_2$) from 1 to 10% by weight of glydicyl (meth)acrylate or
($B_1$) from 50 to 91% by weight of styrene, α-methylstyrene and/or p-methylstyrene
($B_2$) from 1 to 10% by weight of glycidyl (meth)acrylate
($B_3$) from 8 to 40% by weight of acrylonitrile and/or methacrylonitrile.

A second group of suitable monomers are monomers containing lactam groups.

They contain a lactam group of the general formula

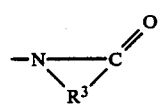

where $R^3$ is a branched or Linear alkylene of from 2 to 15 carbon atoms.

Merely representative examples thereof are β-propiolactams (azetidin-2-ones) of the general formula

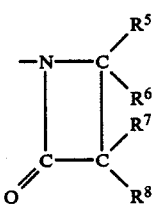

where the substituents $R^5$ to $R^8$ may each be alkyl of from 1 to 6 carbon atoms or hydrogen. They are described by R. Graf in Angew. Chem. 74 (1962), 523–530, and H. Bastian in Angew. Chem. 80 (1968), 304–312. Examples thereof are 3,3'-dimethyl-3-propiolactam, 2-pyrrolidones

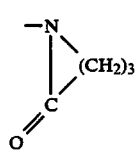

ε-caprolactam

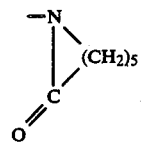

7-enantholactam, 8-capryllactam and 12-laurolactam, as also described by H. Dachs, Angew. Chemie 74 (1962), 540–45.

Of these, 2-pyrrolidones and ε-caprolactams are particularly preferred.

Preferably, the lactam groups as in

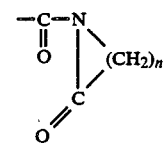

are incorporated in the corresponding monomers via a carbonyl group on the nitrogen.

A particularly preferred example thereof is N-(meth)acryloyl-ε-caprolactam

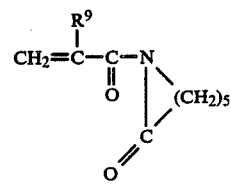

where $R^9$ is hydrogen or methyl.

The proportion of monomers having lactam groups in component B is from 0.1 to 30% by weight, preferably from 0.1 to 5% by weight, based on component B.

As a result, component B can have for example the following compositions:
($B_1$) from 95 to 99.9% by weight of styrene, α-methylstyrene and/or p-methylstyrene
($B_2$) from 0.1 to 5% by weight of N-(meth)acryloyl-ε-caprolactam or, if monomers $B_3$ are present,
($B_1$) from 55 to 91% by weight of styrene, α-methylstyrene and/or p-methylstyrene
($B_2$) from 0.1 to 5% by weight of N-(meth)acryloyl-ε-caprolactam
($B_3$) from 8 to 40% by weight of (meth)acrylonitrile.

Suitable polymeric components containing hydroxyl groups are in principle all polymers having hydroxyl groups which are essentially freely available.

A first group of particularly suitable polymers of this type comprises polycondensates of aliphatic or aromatic diols or more highly polyhydric alcohols with epihalohydrins. Such compounds and processes for their preparation are known per se to those skilled in the art, making further details here superfluous. Merely representative examples are polycondensates of epihalohydrins and dihydroxy compounds which may also be used for preparing polycarbonates and which have turned out to be particularly advantageous. But also suitable are in principle other, in particular aliphatic, diols or more highly polyhydric aromatic or aliphatic alcohols.

Preference is given to using, because of its easy availability, a polycondensate of bisphenol A and epichlorohydrin of the structure

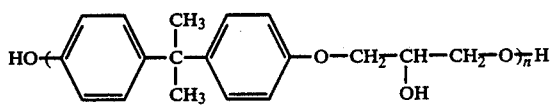

which is commercially available under the name Phenoxy®.

Aside from using polymers already having the hydroxyl group in the main chain it is also possible to use polymers or copolymers which contain these functional groups through the use of suitable monomers in the polymerization, in which case the groups can then likewise be present in the polymers in the main chain or, alternatively, in substituents on the main chain. A further option comprises the grafting of suitable OH-containing monomers onto grafting bases, a suitable grafting base being in principle any polymer not completely incompatible with components (a) and (B). A certain degree of incompatibility can be compensated for by increasing the proportion of hydroxyl groups.

Suitable components (B) are therefore for example polymers based on polyolefins, polystyrene and rubber elastomers having hydroxyl groups —OH obtainable either by using suitable comonomers or, alternatively, by grafting with functional groups —OH. The proportion of comonomers or grafting monomers having hydroxyl groups —OH is dependent on the compatibility of the base polymer of component B with component A. The better the compatibility is, the lower the proportion of OH groups can be. It follows from the aforesaid that a large number of polymeric compounds are suitable for use as component B, of which in what follows only particularly preferred types are described in more detail by way of example.

The first group comprises polymers of vinylphenylcarbinols and copolymers of the aforementioned base polymers containing up to 100 mol % of vinylphenylcarbinols, of which vinylphenyldimethylcarbinols and in particular vinylphenylhexafluorodimethylcarbinol have proved to be particularly suitable. A suitable base polymer or grafting base again advantageously comprises any of the aforementioned types of polymers.

The second group consists of polymers based on vinylphenols and copolymers of the aforementioned base polymers with vinylphenols which may also contain substituents in the nucleus. Substituents which increase the acidity of the phenolic hydrogen are particularly suitable, such as halogen substituents, but also other electron-withdrawing substituents.

Besides these it is also possible in principle to use polymers and copolymers based on any polymerizable or graftable alcohol.

A component B incorporating hydroxyl groups may be prepared in a conventional polycondensation, graft polymerization or copolymerization process, which is why no further details are necessary here.

A suitable component B may also be an olefin polymer which contains epoxy groups. The epoxy groups may be incorporated into the olefin polymer by copolymerization or graft polymerization with epoxy-carrying copolymerizable monomers or by epoxidation of a reactive olefin polymer. Advantageously, these polymers are built up from 0.1 to 50% by weight, in particular from 0.5 to 10% by weight, of monomers having epoxy groups.

Preference is given to copolymers of not less than 50, in particular not less than 60, % by weight of one or more olefins of from 2 to 10 carbon atoms which also contain at least one copolymerizable monomer having epoxy groups with or without further copolymerizable monomers.

Preferred olefins in such copolymers are ethylene, propylene, 1-butene, isobutylene, 1-pentene, 1-hexene, 1-heptene, 1-octene or mixtures thereof, preferably ethylene and propylene.

Preferred epoxy-carrying monomers are ethers of the general formula

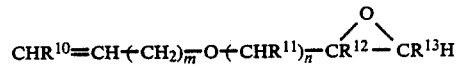

where m is an integer from 0 to 20, n is an integer from 1 to 10 and $R^{10}$, $R^{11}$, $R^{12}$ and $R^{13}$ are each H or an alkyl of from 1 to 8 carbon atoms.

Preferably, m is 0 or 1, n is 1, and $R^1$, $R^2$ and $R^3$ are each H.

Preferred compounds are allyl glycidyl ether and vinyl glycidyl ether. Further epoxy-carrying monomers are epoxy-carrying olefins of the general formula

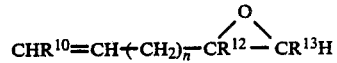

where m, $R^{12}$, $R^{13}$ and $R^{14}$ are each as defined in the preceding formula; preferably n is from 1 to 5, $R^{10}$ is H or methyl and $R^{12}$ and $R^{13}$ are each H, methyl or ethyl.

Particular preference is given to epoxy-carrying esters of acrylic acid or methacrylic acid. Particular industrial importance has been obtained by glycidyl acrylate and glycidyl methacrylate.

Preferred olefin polymers are built up from
(a) from 50 to 90% by weight of olefins of from 2 to 10 carbon atoms, preferably ethylene,
(b) from 1 to 50% by weight of glycidyl acrylate and/or glycidyl methacrylate and optionally
(c) from 1 to 49% by weight of at least one other copolymerizable monomer,
with components a, b and c always adding up to 100% by weight.

The glass transition temperature of the olefin polymer is preferably below 0° C., particularly preferably below −20° C. Preferred copolymerizable monomers are (meth)acrylates, vinyl esters, vinyl ethers and methylbutenol. Examples are methyl (meth)acrylate, ethyl (meth)acrylate, propyl (meth)acrylate and butyl (meth)acrylate, particular preference being given to n-butyl acrylate and 2-ethylhexyl acrylate.

Particularly preferred olefin polymers are built up from
(a) from 50 to 98% by weight of ethylene
(b) from 1 to 40% by weight of glycidyl (meth)acrylate and
(c) from 1 to 45% by weight of n-butyl acrylate and/or 2-ethylhexyl acrylate,
and particularly proven olefin polymers from
(a) from 60 to 95% by weight of ethylene
(b) from 3 to 20% by weight of glycidyl (meth)acrylate
(c) from 10 to 35% by weight of n-butyl acrylate and/or 2-ethylhexyl acrylate.

The olefin polymers may be prepared by any desired method, such as random copolymerization, block copolymerization and graft copolymerization.

Preference is given to random copolymerization under high pressure and at elevated temperatures. The polymers (C) are in general of high molecular weight and have a melt flow index (190/2.16, DIN 53,735) of from 1 to 80.

Besides the aforementioned olefin copolymers other suitable products are those which contain carboxyl groups or derivatives thereof, which are extensively described for example in EP-A-No. 106,027, reference being made thereto for further details.

The last group of examples of component B comprises styrene polymers with carboxylic acids and/or functional derivatives thereof.

These are built up in detail from
from 20 to 95% by weight of styrene and/or substituted styrene of the general formula I,
from 0 to 40% by weight of a primary and/or secondary alkyl ester of acrylic acid or methacrylic acid having from 1 to 8 carbon atoms in the alcohol moiety, acrylonitrile and/or methacrylonitrile,
from 1 to 30% by weight of a polymerizable carboxylic acid and/or a tertiary ester thereof and/or an anhydride of a polymerizable carboxylic acid of from 1 to 20 carbon atoms.

Of the tertiary esters of carboxylic acids, esters of acrylic and methacrylic acid, in particular tert-butyl acrylate, are preferred. A merely representative example of an anhydride is maleic anhydride; acids are acrylic acid, maleic acid and fumaric acid.

Representative examples of this group are copolymers of styrene and maleic anhydride which may additionally contain acrylonitrile and/or primary or secondary alkyl acrylates.

Of the aforementioned functional polymers suitable for use as component B, polymers containing OH groups, in particular the polycondensate of epichlorohydrin and bisphenol A, styrene/acrylonitrile/maleic anhydride copolymers, styrene/glycidyl methacrylate copolymers and olefin copolymers having epoxy groups are particularly preferred.

The essential condition is that at least one of the components ($a_{223}$), ($a_{33}$) or (B) is present. It is of course also possible for two or all three components to be present.

The reactive epoxy and/or carboxyl groups and/or hydroxyl groups presumably act as adhesion promoters between the polyester ($a_1$) and the graft polymer ($a_2$). Whether this adhesion promotion is due to the formation of covalent chemical bonds or due to physical interactions (van der Waals, dipole-dipole etc.), is not as yet decidable.

Component C in the molding compositions according to the invention comprises from 5 to 50, in particular from 7 to 45, particularly preferably from 10 to 40, % by weight, based on the total weight of the molding compositions, of glass fibers. They are commercially available products.

In the molding composition, these glass fibers generally have an average length of from 0.1 to 0.5 mm, preferably from 0.1 to 0.4 mm, and a diameter within the range from 6 to 20 $\mu$m. Particular preference is given to glass fibers made of E-glass. To obtain better adhesion, the glass fibers may have been coated with organosilanes, epoxysilanes or other polymer coatings.

Aside from components (A) to (C), the molding compositions according to the invention may contain customary additives and processing aids.

Customary additives are for example stabilizers and oxidation retarders, agents against thermal decomposition and decomposition by ultraviolet light, lubricants and mold release agents, colorants, such as dyes and pigments, fibrous and pulverulent fillers and reinforcing agents and plasticizers. Such additives are used in the customary active amounts.

The stabilizers may be added to the thermoplastic compositions at any stage of processing. Preferably, the stabilizers are added early on in order to prevent the onset of decomposition before the composition has been protected. Such stabilizers have to be compatible with the composition.

The oxidation retarders and heat stabilizers which may be added to the thermoplastic compositions according to the invention include those which are generally added to polymers, such as halides of metals of group I of the periodic table, e.g. sodium halides, potassium halides or lithium halides in conjunction with copper(I) halides, for example chloride, bromide or iodide. Further suitable stabilizers are sterically hindered phenols, hydroquinones, various substituted representatives of this group and combinations thereof in concentrations up to 1% by weight, based on the weight of the mixture.

Suitable UV stabilizers are likewise those which are generally added to polymers in amounts of up to 2.0% by weight, based on the total weight of the mixture. Examples of UV stabilizers are various substituted resorcinols, salicylates, benzotriazoles, benzophenones and the like.

Suitable lubricants and mold release agents, added for example in amounts of up to 1% by weight to the thermoplastic composition, are stearic acids, stearyl alcohol, stearic esters and stearic amides.

It is also possible to add organic dyes such as nigrosine, pigments, for example titanium dioxide, cadmium sulfide, cadmium sulfide/selenide, phthalocyanines, ultramarine blue and carbon black.

It is also possible to employ nucleating agents, such as talc, calcium fluoride, sodium phenylphosphinate aluminum oxide or finely divided polytetrafluoroethylene, in amounts of for example up to 5% by weight, based on the composition. Plasticizers, such as dioctyl phthalate, dibenzyl phthalate, butyl benzyl phthalate, hydrocarbon oils, N-(n-butyl)benzenesulfonamide, o- and p-tolueneethylsulfonamide, are advantageously added in amounts of up to about 20% by weight, based on the molding composition. Colorants such as dyes and pigments may be added in amounts of up to about 5% by weight, based on the molding composition.

The thermoplastic molding compositions according to the invention can be prepared by mixing components $a_1$, $a_2$, $a_3$ and B, melting in an extruder and adding the glass fibres via an inlet on the extruder. Such processes are known per se and described in the literature. The mixing temperatures in the extruder are in general within the range from 240° to 280° C. The molding compositions according to the invention are notable for good strength, high impact resistance and the particularly good surface structure of the moldings produced therefrom. In addition, an improvement in the longterm stability to water and heat compared with corresponding compositions without component B is obtained.

EXAMPLES 1 to 10

The following components are used:
a₁ Polybutylene terephthalate having a viscosity number of 108, as determined in accordance with German Standard Specification DIN 53,728, Part 3

Impact strength $a_n$: German Standard Specification DIN 53,453 (at 23° C.).

Notched impact strength: German Standard Specification DIN 53 453 (at 23° C.).

The compositions and the results of the measurements are given in the table.

TABLE

| | (all amounts in % by weight) | | | | | | | | |
|---|---|---|---|---|---|---|---|---|---|
| No. | $a_1$ | $a_2/1$ | $a_2/2$ | $a_3/1$ | $a_3/2$ | C | Modulus of elasticity N/mm | Impact strength kJ/m² | Notched impact strength kJ/m² |
| 1* | 49 | 11 | | 10 | | 30 | 9300 | 35 | 7.5 |
| 2* | 42 | 14 | | 14 | | 30 | 9300 | 34 | 8.0 |
| 3* | 56 | 12 | | 12 | | 20 | 6600 | 31 | 6.2 |
| 4 | 49 | 11 | | | 10 | 30 | 9500 | 36 | 8.1 |
| 5 | 49 | | 11 | 10 | | 30 | 9400 | 38 | 9.1 |
| 6 | 49 | | 11 | | 10 | 30 | 9500 | 37 | 8.9 |
| 7 | 42 | | 14 | 14 | | 30 | 9300 | 37 | 9.5 |
| 8 | 42 | 14 | | | 14 | 30 | 9400 | 36 | 9.2 |
| 9 | 56 | | 12 | 12 | | 20 | 6800 | 33 | 7.3 |
| 10 | 56 | | 12 | | 12 | 20 | 6900 | 33 | 7.2 |

* = Comparison test $a_2/1$ Graft polymer of

| | |
|---|---|
| 58.8% by weight of n-butylacrylate<br>1.2% by weight of dihydro-dicyclopentadienyl acrylate | grafting base |
| 30% by weight of styrene<br>10.3% by weight of acrylonitrile | graft sheath | having a weight average particle diameter ($d_{50}$) of 250 nm, prepared by the process described in German Laid-Open Application DOS No. 2,444,584

$a_2/2$ Graft polymer of

| | |
|---|---|
| 58.5% by weight of n-butyl acrylate<br>1.2% by weight of dihydro-dicyclopentadienyl acrylate | grafting base |
| 28.5% by weight of styrene<br>9.8% by weight of acrylonitrile<br>2% by weight of glycidyl methacrylate | graft sheath | prepared in the same way as $a_2/1$, having a $d_{50}$ of 250 nm.

$a_3/1$ Styrene/acrylonitrile copolymer of 81% by weight of styrene and 19% by weight of acrylonitrile having a viscosity number of 100, measured in DMF, of 0.5% by weight strength at 25° C.

$a_3/2$ Styrene/acrylonitrile/glycidyl methacrylate copolymer of 77% by weight of styrene, 5% by weight of glycidyl methacrylate, 18% by weight of acrylonitrile, having a viscosity number of 87, measured in 0.5% strength by weight in DMF at 25° C.

C Glass fibres made of E-glass.

Components $a_1$, $a_2$ and $a_3$ were mixed, melted in an extruder and admixed with glass fibres (C) introduced into the extruder. The extrusion temperature was 260° C. The compositions were then extruded into a water bath, granulated and dried. Thereafter, without further aftertreatment, test specimens were prepared on an injection molding machine.

The mechanical properties were determined as follows:

Modulus of elasticity: German Standard Specification DIN 53,457.

EXAMPLES 11 to 15

The following components were used:

($a_1$) Polybutylene terephthalate having a viscosity number, determined in accordance with German Standard Specification No. 53,728, Part 3 of 108

$a_2/3$ Graft polymer of

| | |
|---|---|
| 58.5% by weight of n-butyl acrylate<br>1.2% by weight of dicyclopentadienylacrylate | grafting base |
| 30% by weight of styrene<br>10% by weight of acrylonitrile | graft sheath | prepared by the process described in German Laid-Open Application DOS No. 2,444,584

$a_3/3$ Styrene/acrylonitrile copolymer of 65% by weight styrene and 35% by weight of acrylonitrile having a viscosity number of 80, determined in DMF, 0.5% strength at 25° C.

B/1 Copolymer of styrene (97% by weight) and glycidyl methacrylate (3% by weight), prepared by continuous thermal copolymerization in the presence of 15% by weight of ethyl benzene at 145° C. under 800 kPa ($M_w$=120,000; weight average)

B/2 Terpolymer of styrene, acrylonitrile and maleic anhydride (weight ratio 68/22/10) having a viscosity of 80, measured 0.5% strength by weight in DMF at 25° C.

B/3 Polycondensate of bisphenol A and epichlorhydrin (Phenoxy ® from Union Carbide)

B/4 Terpolymer of ethylene/n-butyl acrylate and glycidyl methacrylate (weight ratio 65/32/3), prepared by the process described in EP-A No. 206,267

C Glass fibres made of E-glass

Components $a_1$, $a_2$, $a_3$ and B were mixed, melted in an extruder and admixed with the glass fibers introduced into the extruder. The extrusion temperature was 260° C. The compositions were then extruded into a water bath, granulated and dried. Thereafter, without further after-treatment, test specimens were prepared on an injection molding machine.

The mechanical and thermal properties were determined as follows:

Vicat B: German Standard Specification DIN 53,560.
Bending strength: German Standard Specification DIN 53,452.
Modulus of elasticity: German Standard Specification DIN 53,457.
Impact strength $a_n$: German Standard Specification DIN 53,453.
Notched impact strength: German Standard Specification DIN 53,453.
Damaging energy: German Standard Specification DIN 53,443.

The compositions are given in Table 1 and the results of the measurements in Table 2.

TABLE 1

| Example | Portion [% by wt.] | Component A Composition [% by wt.] $a_1$ | $a_2/3$ | $a_3/3$ | B Type | B amount | C |
|---|---|---|---|---|---|---|---|
| 11 | 74.1 | 60 | 20 | 20 | B/1 | 3.7 | 22.2 |
| 12 | 74.1 | 60 | 20 | 20 | B/2 | 3.7 | 22.2 |
| 13 | 74.1 | 60 | 20 | 20 | B/3 | 3.7 | 22.2 |
| 14 | 74.1 | 60 | 20 | 20 | B/4 | 3.7 | 22.2 |
| 15 (Comp.) | 76.9 | 60 | 20 | 20 | — | — | 23.1 |

TABLE 2

| | | Measured results 11 | 12 | 13 | 14 | 15 (Comp.) |
|---|---|---|---|---|---|---|
| Vicat B | [°C.] | 133 | 132 | 128 | 125 | 125 |
| Bending strength $\sigma_bB$ | [N/mm$^2$] | 170 | 168 | 164 | 145 | 145 |
| Modulus of elasticity $E_Z$ | [N/mm$^2$] | 9,600 | 9,700 | 9,400 | 8,500 | 8,500 |
| Impact strength $a_n$ | [kJ/m$^2$] | 35 | 33 | 32 | 41 | 29 |
| Notched impact strength $a_k$ | [kJ/m$^2$] | 8.5 | 8.0 | 7.5 | 12 | 6.5 |
| Damaging energy $w_{50}$ | [N·m] | 0.7 | 0.6 | 0.6 | 2.5 | 0.5 |
| After storage for 30 days at 100° C.: | | | | | | |
| $\sigma_bB$ | [N/mm$^2$] | 145 | 140 | 140 | 125 | 110 |
| $a_n$ | [kJ/m$^2$] | 27 | 25 | 27 | 36 | 17 |
| Surface of molding | | v. good | v. good | v. good | v. good | v. good |

We claim:

1. A thermoplastic molding composition containing as essential components
(A) from 45 to 90% by weight of a mixture of
(a$_1$) from 50 to 80% by weight of a polyester
(a$_2$) from 10 to 25% by weight of a graft polymer built up from
(a$_{21}$) from 50 to 90% by weight of a grafting base comprising an elastomeric polymer based on
(a$_{211}$) from 95 to 99.9% by weight of a C$_2$–C$_{10}$ alkyl acrylate and
(a$_{212}$) from 0.1 to 5% by weight of a polyfunctional monomer having at least two olefinic, non-conjugated double bonds
(a$_{22}$) from 0.1 to 50% by weight of a graft surface comprising
(a$_{221}$) from 50 to 90% by weight of styrene or substituted styrene of the general formula $$R-C=CH_2$$
$$(R^1)_n-\bigcirc$$
(I)

where R is alkyl of from 1 to 8 carbon atoms, hydrogen or halogen, R$^1$ is alkyl of from 1 to 8 carbon atoms or halogen, and n is 0, 1, 2 or 3, or a mixture thereof, and
(a$_{222}$) from 10 to 49% by weight of acrylonitrile or metahcrylonitrile or a mixture thereof, and
(a$_3$) from 10 to 25% by weight of a copolymer of
(a$_{31}$) from 50 to 90% by weight of styrene or substituted styrene of the general formula I or mixtures thereof and
(a$_{32}$) from 10 to 49% by weight of acrylonitrile or methacrylonitrile or a mixture thereof,
(B) from 1 to 20% by weight of a polymeric component having carboxyl, carboxyl derivative, hydroxyl or epoxy groups and
(C) from 5 to 50% by weight of glass fiber.

2. A thermoplastic molding composition as claimed in claim 1, containing as essential components:
(A) from 55 to 90% by weight of a mixture of
(a$_1$) from 50 to 80% by weight of a polyethylene terephthalate or polybutylene terephthalate or a mixture thereof
(a$_2$) from 10 to 25% by weight of a graft polymer built up from
(a$_{21}$) from 50 to 90% by weight of a grafting base based on
(a$_{211}$) from 95 to 99.9% by weight of n-butyl acrylate and/or 2-ethylhexyl acrylate and
(a$_{212}$) from 0.1 to 5% by weight of a difunctional monomer and
(a$_{22}$) from 10 to 50% by weight of a graft surface comprising
(a$_{221}$) from 50 to 90% by weight of styrene or α-methylstyrene or a mixture thereof, and
(a$_{222}$) from 10 to 40% by weight of acrylonitrile, methacryonitrile or a mixture thereof,
(a$_3$) from 10 to 25% by weight of a copolymer of
(a$_{31}$) from 50 to 90% by weight of styrene or α-methylstyrene or of mixtures thereof
(a$_{32}$) from 10 to 49% by weight of acrylonitrile or metahcrylonitrile or a mixture thereof,
(B) from 1 to 20% by weight of a polymeric component having carboxyl, carboxyl derivative, hydroxyl or epoxy groups and
from 10 to 40% by weight of glass fibers.

3. A molding obtainable from a thermoplastic molding composition as claimed in claim 1 or 2 as essential component.

* * * * *